(12) United States Patent
Strimpel et al.

(10) Patent No.: US 12,140,175 B2
(45) Date of Patent: Nov. 12, 2024

(54) FASTENER WITH ALIGNMENT BUSHING

(71) Applicant: FORD GLOBAL TECHNOLOGIES, LLC, Dearborn, MI (US)

(72) Inventors: Chad Michael Strimpel, Maybee, MI (US); Paul Thomas Reinhart, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 17/586,261

(22) Filed: Jan. 27, 2022

(65) Prior Publication Data

US 2023/0235774 A1    Jul. 27, 2023

(51) Int. Cl.
*F16B 33/00*    (2006.01)
*F16B 43/00*    (2006.01)

(52) U.S. Cl.
CPC .................................. *F16B 43/009* (2013.01)

(58) Field of Classification Search
CPC ...................................................... F16B 43/009
USPC .................................................. 411/369, 389
See application file for complete search history.

(56) References Cited

U.S. PATENT DOCUMENTS

| | | | |
|---|---|---|---|
| 2,983,534 A * | 5/1961 | Heller | F16B 43/001 |
| | | | 52/549 |
| 3,037,221 A * | 6/1962 | Lanius, Jr. | B23P 19/08 |
| | | | 29/520 |
| 3,560,052 A * | 2/1971 | Verdier | F16B 43/00 |
| | | | 411/537 |
| 3,889,569 A * | 6/1975 | Fanciullo | F16B 43/001 |
| | | | 411/915 |
| 3,933,358 A * | 1/1976 | Hoer | F01M 11/0408 |
| | | | 285/212 |
| 4,310,273 A * | 1/1982 | Kirrish | F16B 39/282 |
| | | | 411/338 |
| 5,056,975 A * | 10/1991 | Ando | F16B 43/00 |
| | | | 411/162 |
| 5,584,628 A * | 12/1996 | Bernoni | F16B 5/025 |
| | | | 411/533 |
| 5,702,214 A | 12/1997 | Duran | |
| 6,435,791 B1 * | 8/2002 | Bydalek | B60B 3/16 |
| | | | 411/533 |
| 6,435,793 B1 * | 8/2002 | Dobson | F16B 5/0258 |
| | | | 411/533 |
| 6,478,521 B1 * | 11/2002 | Tschunko | F16B 43/02 |
| | | | 411/533 |
| 7,010,831 B1 * | 3/2006 | Beck | F16C 11/02 |
| | | | 403/156 |
| 9,862,422 B2 | 1/2018 | Jarvis et al. | |
| 10,436,236 B2 | 10/2019 | Hodsdon et al. | |

(Continued)

FOREIGN PATENT DOCUMENTS

DE    3411285 A1    10/1985

*Primary Examiner* — Gary W Estremsky
(74) *Attorney, Agent, or Firm* — Vincent Mastrogiacomo; Brooks Kushman P.C.

(57) ABSTRACT

A fastener includes a shank having a threaded section with a first diameter and an unthreaded section with a second, smaller diameter. A flange is attached to the unthreaded section of the shank. A bushing has a tip, a base, and a tapered sidewall extending from the base to the tip. The bushing defines a central hole received on the unthreaded section with the base adjacent to the flange.

17 Claims, 2 Drawing Sheets

(56) References Cited

U.S. PATENT DOCUMENTS

| | | | |
|---|---|---|---|
| 2008/0304906 A1* | 12/2008 | Maj | F16B 43/001 403/23 |
| 2009/0269162 A1* | 10/2009 | Heinrich | F16B 5/0275 411/371.1 |
| 2013/0195577 A1* | 8/2013 | Taneichi | F16B 43/00 411/337 |
| 2017/0335880 A1* | 11/2017 | Prevost | F16B 43/001 |
| 2019/0093340 A1* | 3/2019 | Meine | F16B 33/004 |
| 2019/0234448 A1* | 8/2019 | Owens, II | F16B 43/00 |

* cited by examiner

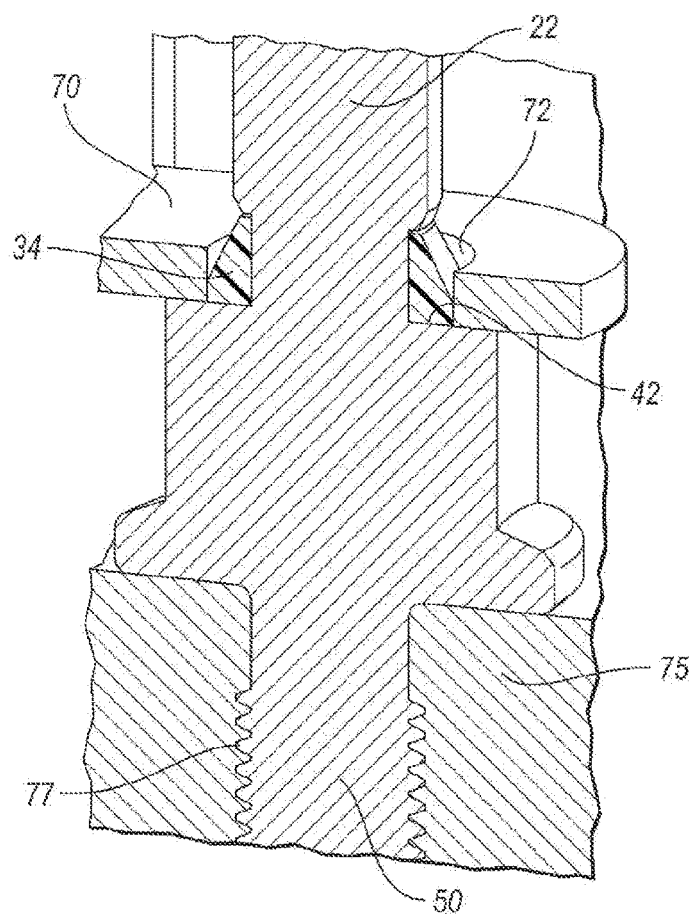
FIG. 2
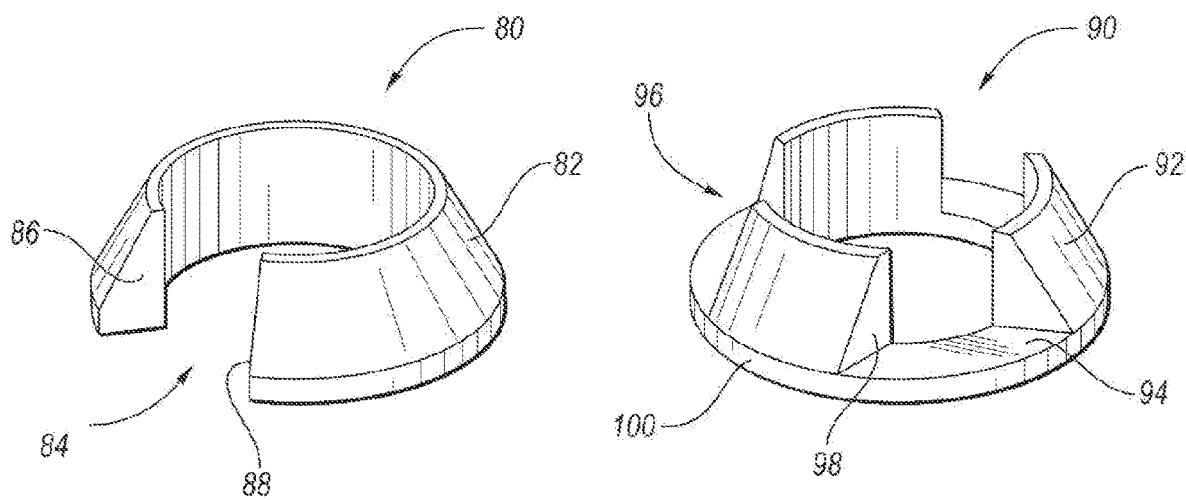
FIG. 3
FIG. 4

FASTENER WITH ALIGNMENT BUSHING

TECHNICAL FIELD

The present disclosure relates to fasteners.

BACKGROUND

Motor vehicles include fasteners for securing components together. For example, fasteners may be used to secure a panel to a support structure. The fastener may be a threaded fastener having a threaded shank configured to extend through a hole of the panel. A nut may be placed on the opposite side and threadably engaged with the threaded shank to secure the panel and provide a clamping load to the joint.

SUMMARY

In one embodiment, A fastener includes a shank having a threaded section with a first diameter and an unthreaded section with a second, smaller diameter. A flange is attached to the unthreaded section of the shank. A bushing has a tip, a base, and a tapered sidewall extending from the base to the tip. The bushing defines a central hole received on the unthreaded section with the base adjacent to the flange.

In another embodiment, a fastener includes a flange, a first threaded shank extending from a first side of the flange, and a second threaded shank extending from a second side of the flange. A first bushing is received on the first shank and has a tip, a base, and a tapered sidewall extending, from the base to the tip. A second bushing, is received on the second shank and has a tip, a base, and a tapered sidewall extending from the base to the tip.

In yet another embodiment, a part assembly includes a component defining a hole and a fastener. The fastener includes a flange, a first threaded shank extending from a first side of the flange, and a bushing received on the first shank and have a tip, a base, and a tapered sidewall extending from the base to the tip. The first shank extends through the hole with the tapered sidewall engaged with a periphery of the hole to center the fastener within the hole.

BRIEF DESCRIPTION OF THE DRAWINGS

FIG. 2 is a cross-sectional perspective view of a part assembly.

FIG. 3 is a perspective view of a bushing according to another embodiment.

FIG. 4 is a perspective view of a bushing according to yet another embodiment.

DETAILED DESCRIPTION

Figure 1:
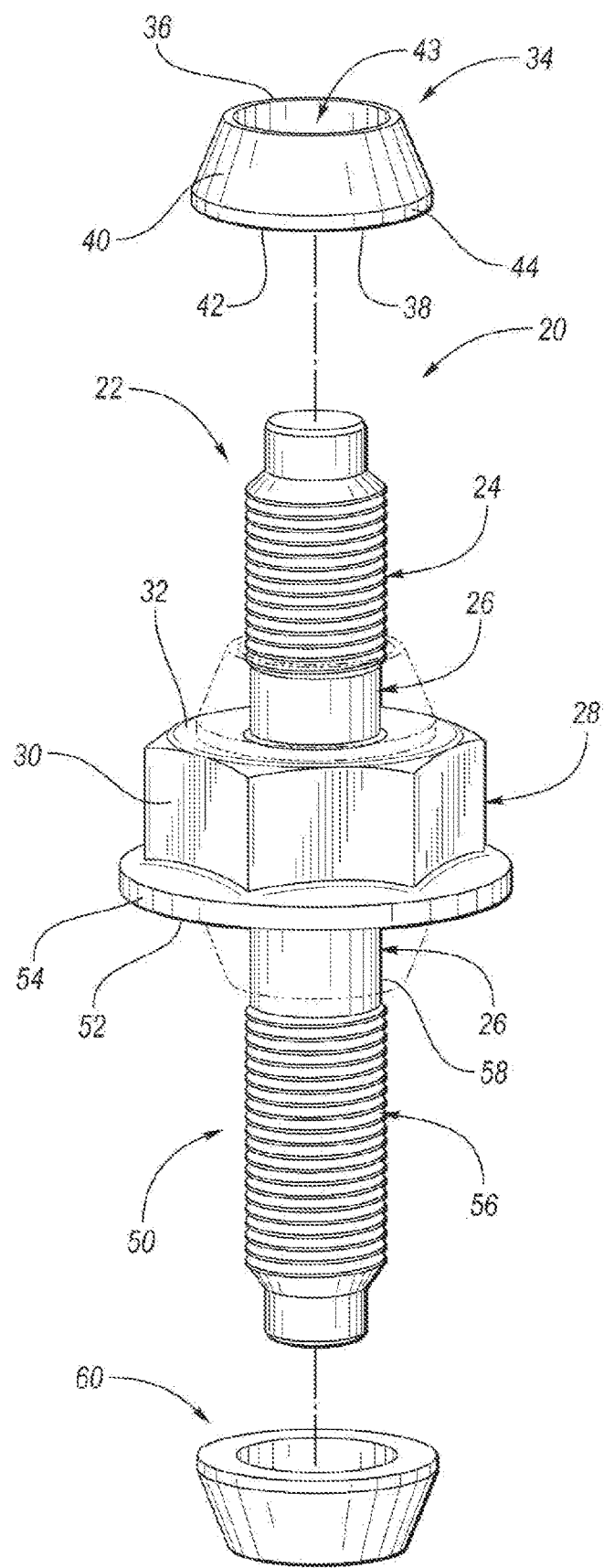
FIG. 1 is an exploded perspective view of a fastener with phantom lines indicating final positioning of bushings.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a fastener 20 includes a threaded shank 22 having a threaded section 24 with a first diameter and an unthreaded section 26 having a second, smaller diameter. A flange or head 28 may be attached to the unthreaded section 26 of the shank 22. The flange 28 may be configured to connect with a tool, such as a wrench, a socket, or the like. The flange 28 may include a plurality of flat sides 30. At least two of the flat sides 30 may be on diametrically opposite. In the illustrated embodiment, the flange 28 includes a hex head configured to engage with a wrench or a socket. The flange 28 includes an upper surface 32 connected to the first shank 22. The upper surface 32 and the unthreaded portion 26 cooperate to form a pocket configured to receive an upper bushing 34.

The bushing 34 may be formed of a polymer, such as rubber, nylon, or the like. The bushing 34 including a tip 36, a base 38, and a tapered sidewall 40 extending from the base to the tip. The base 38 has a larger diameter than the tip 36. The bushing 34 defines a central hole 43 received on the unthreaded section 26 with the base 38 adjacent to, or seated on, the flange 28. The base 38 may include a bottom 42 and a sidewall 44 extending upwardly from the bottom to a lower edge of the tapered sidewall 40. In the illustrated example, the bushing 34 has a frustoconical shape with a single continuous sidewall 40 around the perimeter. The sidewall 44 is circular and has a constant diameter unlike the tapered sidewall.

The bushing 34 may be received on the unthreaded portion 26 of the shank 22 with the bottom 42 supported on the top surface 32 of the flange 28 and with the tip 36 adjacent to the end of the threaded section 26. The diameter of the tip 36 may be less than the diameter of the threaded section 26, and the diameter of the base 38 may be larger than the diameter of the threaded section 26.

The illustrated embodiment of FIG. 1 includes an optional second shank 50 extending from a lower face 52 of the flange 28 to form a two-way fastener. The two-way fastener may be used to thread into a base component and then with an additional component to join the additional component to the base component. The lower face 52 may include an extended collar 54, which is optional. The lower shank 50 includes a threaded portion 56 and unthreaded portion 58. The unthreaded portion 58 may have a smaller diameter than the threaded portion 56. An optional second bushing 60 may be received on the optional second shank 50. That is, in some embodiments, the fastener 20 has a second bushing 60 on the lower shank 50 and in other embodiments, the lower shank 50 does not include an associated bushing. The bushing 60 may be the same or similar to the bushing 34. In another embodiment, the fastener 20 may only include one shank. Here, the flange 28 forms a head of the fastener.

In the illustrated embodiment, the lower shank 50 is configured to be screwed into support structure of a vehicle component. The lower shank 50 may be driven into the support structure using a tool that engages with the flange 28. Once the lower shank 50 is sufficiently torqued to the support structure, one or more components, e.g., a panel, may be received on the upper shank 22. The one or more components may then be secured with another threaded fastener, e.g., a nut, to secure the one or more components to the upper surface 32 of the fastener 20.

The fastener 20 may act as an alignment feature during assembly. Aligning thin-walled components onto a stud or shank can be difficult due to the tendency of thin panels to shift on the shank. The bushing(s) 34/60 provide alignment, FIG. 2 illustrates a thin-walled component 70 being received on the shank 22 of the fastener 20. The component 70 defines a hole 72 configured to be received on the shank 22. The bushing 34 is sized in accordance with the diameter of the hole 72. That is, the diameter of the base roughly approximates the diameter of the hole 72. The bushing 34 is a compressible material; therefore, it may have a slightly larger diameter than the hole 72 when in the resting state and becomes compressed during tightening of the fastener. The tapered wall 40 of the bushing 34 guides the part 70 to center due to the gradually increasing diameter of the bushing 34. Therefore, the fastener 20 insurers concentricity of the part 70 relative to the shank 22. In addition to providing centering, the bushing may also provide cushioning and improve NVH.

The second shank 50 is attached to a base component 75. The base component 75 defines a tapped hole 77 configured to threadably engage with the threads 56 of the shank 50. The second shank 50 may or may not include the bushing 60 depending upon the needs of the part assembly.

FIG. 3 illustrates a bushing 80 according to an alternative embodiment. Here, the bushing 80 has a split design in which the tapered sidewall 82 is discontinuous to form a slot 84. The bushing 80 may otherwise have a generally frustoconical shape similar to the above-described bushings. The split design may provide additional compressibility of the bushing 80 when the panel is tightened down onto the fastener by allowing the ends 86 and 88 to extend towards each other.

FIG. 4 illustrates a bushing 90 having a castle design. Here, the bushing 90 includes a discontinuous tapered sidewall in the form of three tapered sections 92 that are circumferentially spaced relative to each other along a base 94. Three is, of course, just an example and the bushing 90 may include more or less tapered sections 92. Between each of the sections 92 is a slot 96 defined between the ends 98 of the tapered sections 92. In this example, the slot 96 is only between the tapered sections 92, and the bushing 90 has a continuous base 94 having a continuous sidewall 100 similar to the lower sidewall of the base in the bushing 34. The castle design may provide further directional alignment of the part during assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A fastener comprising:
   a shank including a threaded section having a first diameter and an unthreaded section having a second, smaller diameter;
   a flange attached to the unthreaded section of the shank, the flange having at least two flat sides that are diametrically opposing at a periphery of the flange and configured to engage with a tool; and
   a bushing including a tip, a base, and a tapered sidewall extending from the base to the tip, wherein the bushing defines a central hole received on the unthreaded section with the base adjacent to the flange, wherein the base includes a bottom and a sidewall extending from the bottom to the tapered sidewall.

2. The fastener of claim 1, wherein the bushing is frustoconical.

3. The fastener of claim 1, wherein the bushing is formed of polymer.

4. The fastener of claim 1, wherein a diameter of the tip is smaller than a diameter of the base.

5. The fastener of claim 4, wherein the diameter of the tip is less than the first diameter of the threaded section.

6. The fastener of claim 1, wherein the tapered sidewall defines a longitudinally extending slot.

7. The fastener of claim 1, wherein the tapered sidewall is a plurality of tapered sidewalls circumferentially spaced from each other to define slots therebetween.

8. The fastener of claim 1 further comprising a second shank extending from the flange opposite the shank and having a threaded section.

9. The fastener of claim 8 further comprising a second bushing disposed on the second shank.

10. The fastener of claim 9, wherein the second shank defines an unthreaded portion, and the second bushing is disposed on the unthreaded portion of the second shank.

11. The fastener of claim 10, wherein the second bushing includes a tapered sidewall.

12. A fastener comprising:
    a flange;
    a first threaded shank extending from a first side of the flange;
    a second threaded shank extending from a second side of the flange;
    a first bushing received on the first shank and including a tip, a base, and a tapered sidewall extending from the base to the tip; and
    a second bushing received on the second shank and including a tip, a base, and a tapered sidewall extending from the base to the tip.

13. The fastener of claim 12, wherein the flange is a hex head.

14. The fastener of claim 12, wherein the first and second bushings are frustoconical.

15. The fastener of claim 12, wherein the first and second shanks define unthreaded portions and the first and second bushings are disposed on the unthreaded portions.

16. The fastener of claim 12, wherein the first and second bushings are formed of polymers.

17. A part assembly comprising:
    a component defining a hole; and a fastener including a flange, a first threaded shank extending from a first side of the flange, and a bushing received on the first shank and including a tip, a base, and a tapered sidewall extending from the base to the tip; wherein the first shank extends through the hole with the tapered sidewall engaged with a periphery of the hole to center the fastener within the hole, and the fastener further includes a second threaded shank extending from a second side of the flange and a second bushing received on the second shank and including a tip, a base, and a tapered sidewall extending from the base to the tip of the second bushing, and further comprising a base component defining a second hole that receives the second shank therein.

* * * * *